Patented Sept. 15, 1936

2,054,689

UNITED STATES PATENT OFFICE 2,054,689

METHOD OF TREATING COFFEE

Herman P. Andresen, Chicago, Ill.

No Drawing. Application January 4, 1934,
Serial No. 705,238

7 Claims. (Cl. 99—68)

Coffee is a beverage of almost universal use. I find that while the character or quality of a coffee beverage is dependent somewhat on the variety of coffee berry from which it is brewed, much also depends upon the treatment of the coffee berry and the manner in which it is prepared.

The coffee berry contains a number of constituents which gives to the beverage brewed therefrom its typical coffee flavor. Perhaps the most valuable constituent affecting the flavor and making for a more palatable beverage is caffeol, which is principally developed during the roasting operation. Caffeol, however, is quite volatile, and hence is easily lost.

In the commercial production of coffee for beverage purposes, the coffee berry is roasted and then distributed through the usual channels of trade and finally obtained by the ultimate consumer. I find that during the roasting operation, as heretofore practiced, a considerable part of the valuable constituents of the coffee berry, such as caffeine, fat and other organic substances, are irretrievably lost. Then, of course, after the coffee berry has been roasted by the usual methods heretofore prevailing, further deterioration takes place because there is an additional loss of the valuable volatile constituents which give to the brewed beverage its typical and characteristic coffee flavor. This applies especially to caffeol.

One object of the invention is to provide a method of producing a composition of matter wherewith the beverage coffee with cream can be prepared in a more convenient, economical manner.

Another object of the invention is to provide an improved method of producing a composition of matter for use in preparing the beverage coffee with cream, wherein coffee is roasted in an edible oil or fat, whereby certain valuable constituents, ordinarily lost, are saved and whereby it becomes possible to substitute such edible oil or fat for the butterfat in cream, thereby permitting the use of the more inexpensive milk.

Again, it is an object of my invention to produce a colloidal emulsified coffee using ordinary milk or powdered milk and water to act as the emulsifying and dispersing agent.

A further object of the invention is to provide a method of roasting coffee whereby an improved product is obtained.

Still another object of the present invention is to provide a new method of roasting coffee whereby those valuable constituents which are normally lost during the roasting operation, are captured or absorbed and retained for subsequent use.

A further object of the invention is to provide a method whereby the roasted coffee shall be prevented from deteriorating during the time usually required under present methods of distribution of coffee to the ultimate consumer.

Again, it is an object of the invention to provide a composition of matter whereby it shall be possible to produce a beverage coffee in a more economical, efficient and convenient manner.

Another object of the invention is to provide a composition of matter wherewith it shall be possible conveniently and economically to prepare a beverage which shall contain both coffee and cream in desired proportions. The word "cream" in this specification is to be interpreted broadly and is to include all edible fats and oils and milk or its equivalents.

Other objects of my invention will appear as I proceed with the specification.

Under my method of roasting coffee, the green or unroasted coffee berry, either whole, ground or pulverized, is placed in an edible oil or fat and there retained for a sufficient length of time to complete the roasting operation. It will be understood that the edible oil or fat will be at a sufficiently high temperature to properly roast the coffee berry. While various oils or fats may be used, it is preferable that the oil or fat employed should have a smoking temperature somewhat higher than that at which coffee is normally roasted.

By roasting the coffee berry in such an edible oil or fat, any volatile constituents which are normally lost during the coffee roasting operation, as heretofore practiced, are absorbed or retained in the edible oil or fat.

It will be understood that I have now produced a mixture of a roasted coffee and an edible oil or fat. This mixture can readily be made into various forms, depending on the degree of fineness of the coffee, such as for instance, a paste. Such product could be used for making the beverage coffee or it could be stored for further use, or further processing. Such a composition, however, would not be readily miscible in water. Therefore, in order to make this composition of matter miscible in water so that the beverage may be produced by the mere addition of a suitable amount of hot or cold water, I next filter, or otherwise remove, the coffee from the edible oil or fat, preferably while hot; then, with the coffee and using water, make a strong liquid coffee by either the infusion, decoction or any other method, thereby obtaining the desirable water soluble parts of the coffee. Then, with this liquid, I proceed to make an oil-in-water emulsion, utilizing the edible oil or fat in which the coffee was roasted and which contains such of the valuable constituents as the coffee berry gave up during the roasting operation. The product thus obtained is an emulsified coffee.

In the preparation of the emulsion above referred to, I prefer to use as an emulsifying agent powdered milk and water or evaporated milk because the casein and lactalbumin of milk serve as the stabilizing agent. Furthermore, if sweet unsalted butter were used as the roasting medium I will have provided a product to which need be added only hot water in order to provide the beverage coffee with cream, for in this case the cream has been reconstructed from the butter fat and the milk. Other edible fats or oils may, however, be used instead of butter fat.

The product prepared by the above method can be placed in containers of any desired form, sealed and preferably sterilized so that the product may be conveniently distributed for later use.

In the specification I have stated several times that milk may be used as the emulsifying agent. It will be understood, however, that cream may be used because ordinary cream contains but fifteen to twenty per cent fat and the remainder is milk. Ordinarily, however, cream would be more expensive.

The many advantages of my method of roasting coffee and the composition of matter which I have disclosed will be apparent to those skilled in the art to which this appertains, without further comment.

Certain advantages of my invention may be attained by using the coffee berry which may be roasted by any of the usual roasting methods. With such a roasted coffee, a liquid coffee extract is made which is then emulsified with any edible fat or oil. The emulsifying agent may be cream, milk or the like.

I claim as my invention:

1. The herein described method which consists in roasting coffee in an edible oil or fat, filtering or otherwise removing the coffee from the oil or fat, making a strong liquid from the coffee by infusion, decoction or the like and then converting such liquid into an oil-in-water emulsion, using the oil or fat in which the coffee was roasted as the internal phase and using milk or powdered milk and water as the emulsifying agent.

2. The hereindescribed method which consists in heating green coffee in an edible oil or fat so that the coffee is roasted and the oil or fat is charged with caffeol and other aromatic and oil soluble substances from the coffee, removing the roasted coffee from the oil or fat, combining the roasted coffee with water to make a strong liquid extract or brew that includes the water soluble substances of the roasted coffee, then emulsifying the extract or brew and the charged oil or fat from which the roasted coffee has been removed, into an oil in water emulsion using milk as the emulsifying and stablizing agent.

3. The hereindescribed method which consists in heating green coffee in a sweet butter fat so that the coffee is roasted and the fat is charged with caffeol and other aromatic and oil soluble substances from the coffee, removing the roasted coffee from the fat, combining the roasted coffee with water to make a strong liquid extract or brew that includes the water soluble substances of the roasted coffee, then emulsifying the extract or brew and the oil or fat from which the coffee has been removed, into an oil in water emulsion using milk as the emulsifying and stabilizing agent.

4. The hereindescribed method which consists in heating subdivided green coffee in an edible oil or fat so that the coffee is roasted and the oil or fat is charged with caffeol and other aromatic and oil soluble substances from the coffee, removing the roasted coffee from the oil or fat, combining the roasted coffee with water to make a strong liquid extract or brew that includes the water soluble substances of the roasted coffee, then emulsifying the extract or brew and the charged oil or fat from which the roasted coffee has been removed, into an oil in water emulsion using milk as the emulsifying and stabilizing agent.

5. The hereindescribed method which consists in heating subdivided green coffee in a sweet butter fat so that the coffee is roasted and the fat is charged with caffeol and other aromatic and oil soluble substances from the coffee, removing the roasted coffee from the fat, combining the roasted coffee with water to make a strong liquid extract or brew that includes the water soluble substances of the roasted coffee, then emulsifying the extract or brew and the oil or fat from which the coffee has been removed, into an oil in water emulsion using milk as the emulsifying and stabilizing agent.

6. The hereindescribed method which consists in heating green coffee in an edible oil or fat so that the coffee is roasted and the oil or fat is charged with caffeol and other aromatic and oil soluble substances from the coffee, removing the roasted coffee from the oil or fat, combining the roasted coffee with water to make a strong liquid extract or brew that includes the water soluble substances of the roasted coffee, then emulsifying the extract or brew and the charged oil or fat from which the roasted coffee has been removed, into an oil in water emulsion using powdered milk as the emulsifying and stabilizing agent.

7. The hereindescribed method which consists in heating green coffee in a sweet butter fat so that the coffee is roasted and the fat is charged with caffeol and other aromatic and oil soluble substances from the coffee, removing the roasted coffee from the fat, combining the roasted coffee with water to make a strong liquid extract or brew that includes the water soluble substances of the roasted coffee, then emulsifying the extract or brew and the oil or fat from which the coffee has been removed, into an oil in water emulsion using powdered milk as the emulsifying and stabilizing agent.

HERMAN P. ANDRESEN.